UNITED STATES PATENT OFFICE.

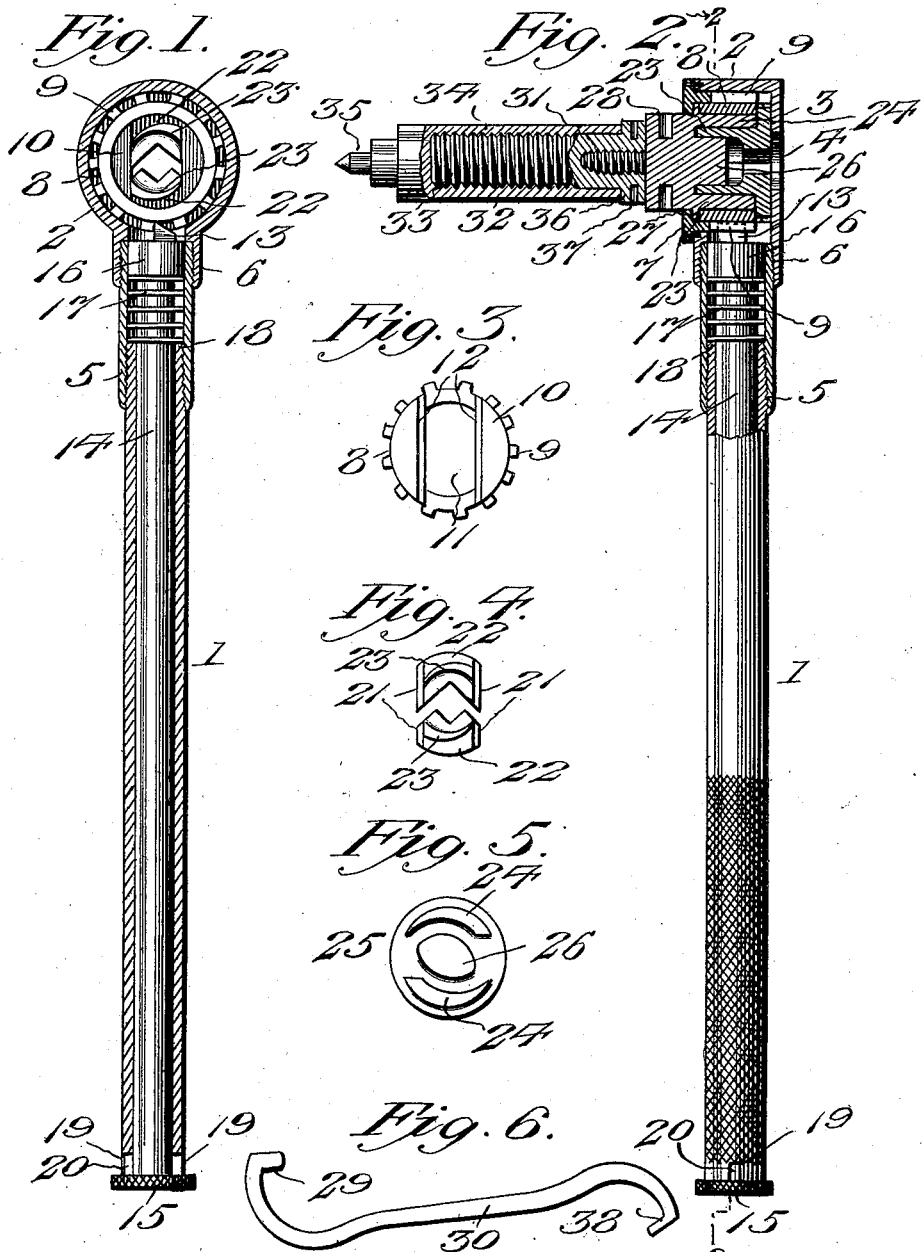

CHARLES O. MORLEY, OF BROOKLYN, NEW YORK.

WRENCH.

No. 889,710. Specification of Letters Patent. Patented June 2, 1908.

Application filed September 20, 1904, Serial No. 225,251. Renewed March 11, 1908. Serial No. 420,449.

*To all whom it may concern:*

Be it known that I, CHARLES O. MORLEY, a citizen of the United States, residing at Brooklyn, in the county of Kings and State of New York, have invented new and useful Improvements in Wrenches, of which the following is a specification.

This invention relates to tap wrenches designed especially for holding and manipulating the taps or drills of drilling machines, and has for its objects to produce a simple, efficient device of this character which may be readily adjusted for holding taps of varying sizes and one which in practice will securely engage and readily operate taps of varying cross sectional forms.

To these ends, the invention comprises the novel features of construction and combination of parts more fully hereinafter described.

In the accompanying drawings, Figure 1 is a longitudinal sectional elevation taken on the line 2—2 of Fig. 2 of a wrench embodying the invention. Fig. 2 is a side elevation partly in section of the same. Fig. 3 is an end elevation of the ratchet member or head. Fig. 4 is an end elevation of the tap engaging jaws. Fig. 5 is an end view of the jaw operating cam head. Fig. 6 is a view of the head operating member or wrench.

Referring to the drawings, 1 designates a tubular handle or shank provided at its forward end with a hollow portion or casing 2 of circular form in cross section and having its end wall 3 perforated as at 4, the shank 1, being composed of a pair of sections in threaded engagement, as at 5, and preferably detachably engaged with the casing 2 by a threaded connection 6, while the casing 2 is provided opposite the wall 3 with a removable cap 7.

Arranged for rotation within the casing 2 is an annular ratchet member or ring 8 provided on its periphery with spaced teeth 9 and having at one end a wall 10 provided with a slot 11, the marginal edges of which are grooved to produce parallel guides 12, this ratchet member being normally engaged by a pawl 13 carried by the inner end of a cylindrical member or rod 14 extending longitudinally through the shank 1 and having at its outer end a milled nut or head 15 designed to seat upon the outer end of the shank. The rod 14 which is formed at its inner end with a shoulder 16 is normally pressed to position for maintaining the pawl in engagement with the ratchet by means of a normally expanded spring 17 seated between the shoulder 16 and a shoulder 18 formed by the adjacent end of one section of the shank, while the other or outer end of said shank section has formed therein a pair of oppositely disposed slots or seats 19 either of which may receive a pin or projection 20 fixed upon the rod 14 for preventing rotation of the latter within the shank, it being apparent, however, that the rod may by grasping the head 15 be withdrawn longitudinally of the shank against the action of the spring 17 sufficiently for releasing the pin 20 from one of the slots and partially rotating the rod to reverse the position of the pawl relative to the ratchet whereby the direction of rotation of the latter within the casing 2 may be reversed and the rod again locked by seating the fixed portion or pin 20 within the other slot 19.

Seated within the movable ratchet ring 8 and having guide portions or flanges 21 engaging and coöperating with the guides 12 is a pair of movable tap engaging and gripping jaws 22 which have cam faced portions or extensions 23 extended within the ratchet ring 8 and adapted to be acted upon by reversely arranged cam portions or extensions 24 carried by a cam head 25 whereby the jaws are moved toward each other to engaging or gripping position there being also formed upon the head 25 a central cam portion 26 designed to seat between the cam portions 23 of the jaws for moving the latter away from each other to non-engaging position. The head 25, the cam portions of which fit within the ring 8, is provided midway of its length with an annular flange 27 adapted to be engaged by the cap or ring 7 for maintaining the head 25 and other parts of the mechanism in proper assemblage within the casing 2, while the portion of the head 25 which projects beyond the cap 7 has formed therein a series of transverse sockets or seats 28 to receive the engaging portion or finger 29 of an implement 30 by which the cam head may be rotated to thus move the jaws 22 to and from gripping position.

Formed upon and centrally of the outer end of the head 25 is a screw 31 designed to enter a suitably threaded socket in a center post 32 for detachably securing the latter to the wrench. This center post preferably consists of an inner member or screw 33 and an outer tubular member or sleeve 34 in telescopic threaded engagement with the screw whereby the post is arranged for longitudinal extension, there being formed at the outer end of the member or sleeve 34 a center pin or point 35 which in practice engages the centering head of the drilling machine while the tap or drill has its shank entered through the opening 4 and securely clamped between the jaws 22. It is apparent from this arrangement that when the handle or shank 1 is manipulated, the pawl will act upon the ratchet ring 8 for rotating the latter and consequently driving the tap or drill clamped between the jaws 23 and further that during the operation of the drill in this manner it may be set up from time to time as circumstances require by rotating the outer member or sleeve 34 upon the inner member of screw 33, which latter action causes a lengthening or expansion of the center post.

In order that the post may be detached from the wrench when required for the purpose of reducing the height of the wrench, I have provided the screw 33 adjacent to its inner end with an annular shoulder 36 having therein a series of radial sockets or seats 37 designed to receive the engaging portion or tip 38 of the implement 30 for thus rotating the post bodily and detaching it from the screw 31.

From the foregoing it is apparent that I produce a simple device admirably adapted for the attainment of the ends in view, it being understood that minor changes in the details herein set forth may be resorted to without departing from the spirit of the invention.

Having thus described the invention what is claimed as new, is:

In a device of the class described, a shank provided at its forward end with a hollow casing, a ratchet ring rotatively arranged in the casing and having an end wall provided with a guide slot, the opposite marginal edges of said slot being grooved to produce parallel guides, a pair of coöperating relatively movable clamping members disposed in said slot and having cam portions projecting into the ring, said clamping members having their side edges grooved to form guides for coöperation with those in the ring, a cam head rotatively arranged in the ring and having cam portions formed to coöperate with those on the clamping members for positively moving the same to and from clamping position, said head being provided between its ends with a marginal flange, a cap for closing one end of the casing and formed for engagement with said flange to hold the parts in assembled relation, and a dog connected for operation by the shank to rotate the ratchet ring.

In testimony whereof, I affix my signature in presence of two witnesses.

CHARLES O. MORLEY.

Witnesses:
 JOHN E. SULLIVAN,
 LOUIS ULRICH.